United States Patent
Martin et al.

(10) Patent No.: US 8,417,220 B2
(45) Date of Patent: *Apr. 9, 2013

(54) METHOD, APPARATUS AND COMPUTER PROGRAM PRODUCT FOR SECURITY CONFIGURATION COORDINATION DURING A CELL UPDATE PROCEDURE

(75) Inventors: Brian Martin, Farnham (GB); Keiichi Kubota, Weybridge (GB)

(73) Assignee: Renesas Mobile Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/078,223

(22) Filed: Apr. 1, 2011

(65) Prior Publication Data

US 2012/0252404 A1    Oct. 4, 2012

(51) Int. Cl.
*H04M 1/66* (2006.01)
(52) U.S. Cl. .......... 455/411; 455/410; 455/435.1; 455/432.1; 455/433; 455/436; 380/270
(58) Field of Classification Search .......... 455/410, 455/411, 431.1–432.3, 433, 435.1–435.3, 455/436–444, 456.1; 380/270
See application file for complete search history.

(56) References Cited

U.S. PATENT DOCUMENTS

| | | | |
|---|---|---|---|
| 2003/0100291 A1 | 5/2003 | Krishnarajah | |
| 2005/0276417 A1* | 12/2005 | Funnell | 380/270 |
| 2007/0265875 A1* | 11/2007 | Jiang et al. | 705/1 |
| 2008/0261600 A1 | 10/2008 | Somasundaram et al. | |
| 2010/0113033 A1* | 5/2010 | Qiu et al. | 455/438 |

FOREIGN PATENT DOCUMENTS

| | | |
|---|---|---|
| EP | 2192804 | 6/2010 |
| EP | 2203008 | 6/2010 |
| EP | 2293610 | 3/2011 |
| GB | 2471455 | 1/2011 |
| WO | WO 2011/091865 A1 | 8/2011 |
| WO | WO 2011/160073 A1 | 12/2011 |

OTHER PUBLICATIONS

Combined Search and Examination Report from corresponding GB Patent Application No. 1105647.0, dated Jun. 21, 2011 (6 pgs.).
Applicant's Response to Combined Search and Examination Report for GB Patent Application No. 1105647.0, dated Jul. 13, 2011 (10 pgs.).
Notification of Allowance for GB Patent Application No. 1105647.0, dated Aug. 25, 2011 (1 pg.).
Communication from United Kingdom Patent Office for Patent Application No. GB1105647.0, dated Apr. 3, 2012.

(Continued)

*Primary Examiner* — Wayne Cai
(74) *Attorney, Agent, or Firm* — Alston & Bird LLP

(57) ABSTRACT

A method, apparatus and computer program product are provided for maintaining synchronization with respect to the security configurations of the network and a mobile terminal, even during a cell update procedure. A method may include causing a cell update message to be provided during performance of a cell update procedure and including, with the cell update message, a security configuration information element indicating that a mobile terminal has applied an updated security configuration in an instance in which the mobile terminal has applied the updated security configuration. The method may also include, with the cell update message, the information element indicating that the mobile terminal has reverted to a prior security configuration in an instance in which the mobile terminal has reverted to a prior security configuration. Corresponding apparatuses and computer program products are also provided.

18 Claims, 3 Drawing Sheets

OTHER PUBLICATIONS

Extended European Search Report for UK Application No. 11184417.1, dated Feb. 3, 2012 (6 pgs).

3GPP TSG RAN WG2 Meeting #70; Montreal, Canada; May 10-14, 2010; "Enhanced Security Mode Procedure Handling in Case of Delayed L2 ACK"; R2-103005; 4 pages.

3GPP TSG-RAN2#73; Taipei, Taiwan; Feb. 21-25, 2011; Change Request 25.331 CR CRNum, rev—Current Version 10.2.0; "Optionality of Enhanced Security Mode Procedure Handling in Case of Delayed L2 ACK"; R2-110887; 3 pages.

3GPP TSG RAN WG2 #72; Jacksonville, USA; Nov. 15-19, 2010; Change Request 25.331 CR 4427, rev—Current Version 10.1.0; "Enhanced Security Mode Procedure Handling"; R2-106774; 16 pages.

* cited by examiner

METHOD, APPARATUS AND COMPUTER PROGRAM PRODUCT FOR SECURITY CONFIGURATION COORDINATION DURING A CELL UPDATE PROCEDURE

TECHNOLOGICAL FIELD

Embodiments of the present invention relate generally to a method, apparatus and computer program product for coordinating the security configuration of a network and a mobile terminal, and more particularly, to a method, apparatus and computer program product for providing information regarding the security configuration of a mobile terminal during a cell update procedure.

BACKGROUND

Various security measures are employed to protect the messages exchanged between a network, such as a universal mobile telecommunications system (UMTS) terrestrial radio access network (UTRAN) and a mobile terminal so as to permit messages to be exchanged therebetween in a secure manner. Among other security measures, a security configuration may be established between the network, such as a radio network controller (RNC), and a mobile terminal that establishes the ciphering and integrity protection that is to be provided for the messages subsequently exchanged therebetween. For increased security, the security configuration may be changed from time to time. However, the security configuration must be changed in the same fashion by both the network and the mobile terminal as a mismatch in the security configurations of the network and the mobile terminal may result in a loss of service.

In order to change the security configuration, the network and the mobile terminal generally engage in a predefined signaling sequence. This signaling sequence may take some time, and indeed, may include a period of time during which the network has completed the transition to the new security configuration, but the mobile terminal has not yet completed the transition. During this time period, the mobile terminal may be awaiting an acknowledgement from the network indicating that the security configuration procedure has been completed by the network. Until the mobile terminal receives this acknowledgement, however, the change in the security configuration will not have been completed by the mobile terminal.

In some instances, a mobile terminal may revert to the prior security configuration after the network has completed the transition to the new security configuration. This possibility is exacerbated by the time delay following the completion of the network's security configuration transition to the acknowledgement of the security configuration transition that is to be provided by the network to the mobile terminal. Although the mobile terminal may revert to the prior security configuration for various reasons, the mobile terminal may revert to the prior security configuration in an instance in which a cell update, such as a cell reselection, occurs during the transition to a new security configuration. However, the network may have already completed the transition to the new security configuration and may be unaware of the reversion of the mobile terminal to the prior security configuration. The subsequent mismatch between the security configurations of the network and the mobile terminal may thereafter disadvantageously cause a loss of signal.

Some mobile terminals may be configured to provide an information element with the cell update message affirmatively indicating that the mobile terminal has reverted to the prior security configuration. For networks that have been updated so as to recognize and respond to such an information element in the cell update message, the network may interpret a cell update message that does not include such an information element as being indicative of the mobile terminal having also completed the transition to the new security configuration. However, some mobile terminals, such as legacy or older mobile terminals, may not be configured to provide such an information element with the cell update message. As such, these mobile terminals may provide a cell update message that fails to include an information element, even in an instance in which the mobile terminal has reverted to the prior security configuration. As such, the network may be effectively left to guess as to whether the mobile terminal has not included the additional information element with the cell update message because the mobile terminal did not revert to the prior security configuration but is operating, instead, in conformance with the new security configuration or whether the mobile terminal has simply not been configured to provide the additional information element in conjunction with the cell update message. Indeed, a network that has been updated may interpret such a cell update message that lacks an information element as an indication that the mobile terminal has not reverted to the prior security configuration, but is operating in accordance with the new security configuration, even though the mobile terminal may simply not be configured to provide the additional information element regardless of the security configuration in which the mobile terminal is operating. Further, a network that has not been upgraded to recognize such information elements may automatically revert to the prior security configuration in an instance in which a cell update message, either with or without the additional information element, is received during the transition to a new security configuration. In either scenario in which the network has been updated or in which the network has not been updated, a security configuration mismatch may be created between the network and the mobile terminal which may, in turn, result in a loss of service.

In another approach, the mobile terminal may provide an indication upon connection establishment, such as radio resource control (RRC) connection establishment, that the mobile terminal will provide the additional information element in conjunction with a cell update message to indicate that the mobile terminal has reverted to the prior security configuration. Based upon this indication provided by the mobile terminal in conjunction with the connection establishment, a network, such as an RNC, may appropriately respond to the inclusion of an information element or the lack of an information element relating to the security configuration of the mobile terminal in the cell update message. In this approach, however, the network, such as the RNC, is required to determine the capability of the mobile terminal with respect to the provision of this additional information element in conjunction with the cell update procedure in that the RNC needs to check the capability of the mobile terminal as well as the contents of a received cell update message to determine which security configuration is used. Additionally, this approach may not be readily implementable previously released mobile terminals, that is, legacy mobile terminals, since the mobile terminal is required to have a new capability reporting in uplink signaling.

BRIEF SUMMARY

A method, apparatus and computer program product are therefore provided in accordance with an example embodiment in order to maintain synchronization with respect to the security configurations of the network and a mobile terminal, even during a cell update procedure. As such, the method, apparatus and computer program product of one embodiment may avoid issues that may otherwise arise with mismatched security configurations including loss of signal. The method, apparatus and computer program product of some example embodiments may also be advantageously implemented for legacy mobile terminals because the mobile terminal may not need to signal any mobile terminal capability for this feature. Additionally, the network implementation may be simplified since the network may determine which security configuration is used in accordance with embodiments of the present invention by checking the received cell update message and does not need to maintain the security capability of the mobile terminal as the part of mobile terminal context.

In one embodiment, a method is provided that includes causing a cell update message to be provided during performance of a cell update procedure and including, with the cell update message, a security configuration information element indicating that a mobile terminal has applied an updated security configuration in an instance in which the mobile terminal has applied the updated security configuration. The method of this embodiment also includes, with the cell update message, the security configuration information element indicating that the mobile terminal has reverted to a prior security configuration in an instance in which the mobile terminal has reverted to the prior security configuration.

The security configuration information element indicating that the mobile terminal has applied an updated security configuration may be a security configuration information element indicating that the mobile terminal has not reverted to the prior security configuration. A method of one embodiment may apply the updated security configuration prior to causing the cell update message to be provided. Conversely, the method of another embodiment may revert to the prior security configuration prior to causing the cell update message to be provided. In one embodiment, the cell update message may be provided after completion of a cell reselection procedure. The method may also include commencing the cell update procedure during and prior to completion of a security configuration command procedure.

In another embodiment, an apparatus is provided that includes processing circuitry configured at least to cause a cell update message to be provided during performance of a cell update procedure and to include, with the cell update message, a security configuration information element indicating that a mobile terminal has applied an updated security configuration in an instance in which the mobile terminal has applied the updated security configuration. The processing circuitry of this embodiment is also configured to include, with the cell update message, the security configuration information element indicating that the mobile terminal has reverted to a prior security configuration in an instance in which the mobile terminal has reverted to the prior security configuration.

The security configuration information element indicating that the mobile terminal has applied an updated security configuration may be a security configuration information element indicating that the mobile terminal has not reverted to the prior security configuration. The processing circuitry of one embodiment may be configured to apply the updated security configuration prior to causing the cell update message to be provided. Conversely, the processing circuitry of another embodiment may be configured to revert to the prior security configuration prior to causing the cell update message to be provided. In one embodiment, the cell update message may be provided after completion of a cell reselection procedure. The processing circuitry may also be configured to commence the cell update procedure during and prior to completion of a security configuration command procedure.

In a further embodiment, a computer program product is provided that has at least one computer-readable storage medium with computer-executable program code instructions stored therein. The computer-executable program code instructions may include program code instructions for causing a cell update message to be provided during performance of a cell update procedure and for including, with the cell update message, a security configuration information element indicating that a mobile terminal has applied an updated security configuration in an instance in which the mobile terminal has applied the updated security configuration. The computer-executable program code instructions of this embodiment also include program code instructions for including, with the cell update message, the security configuration information element indicating that the mobile terminal has reverted to a prior security configuration in an instance in which the mobile terminal has reverted to the prior security configuration.

The security configuration information element indicating that the mobile terminal has applied an updated security configuration may be a security configuration information element indicating that the mobile terminal has not reverted to the prior security configuration. The computer-executable program code instructions of one embodiment may also include program code instructions for applying the updated security configuration prior to causing the cell update message to be provided. Conversely, the computer-executable program code instructions of another embodiment may include program code instructions for reverting to the prior security configuration prior to causing the cell update message to be provided. In one embodiment, the cell update message may be provided after completion of a cell reselection procedure. The computer-executable program code instructions may also include program code instructions for commencing the cell update procedure during and prior to completion of a security configuration command procedure.

In yet another embodiment, an apparatus is provided that includes means for causing a cell update message to be provided during performance of a cell update procedure and means for including, with the cell update message, a security configuration information element indicating that a mobile terminal has applied an updated security configuration in an instance in which the mobile terminal has applied the updated security configuration. The apparatus of this embodiment also includes means for including, with the cell update message, the security configuration information element indicating that the mobile terminal has reverted to a prior security configuration in an instance in which the mobile terminal has reverted to the prior security configuration. The security configuration information element indicating that the mobile terminal has applied an updated security configuration may be a security configuration information element indicating that the mobile terminal has not reverted to the prior security configuration.

An apparatus of one embodiment may include means for applying the updated security configuration prior to causing the cell update message to be provided. Conversely, the apparatus of another embodiment may include means for reverting to the prior security configuration prior to causing the cell update message to be provided. In one embodiment, the cell update message may be provided after completion of a cell reselection procedure. The apparatus may also include means for commencing the cell update procedure during and prior to completion of a security configuration command procedure.

BRIEF DESCRIPTION OF THE SEVERAL VIEWS OF THE DRAWINGS

Figure 1:
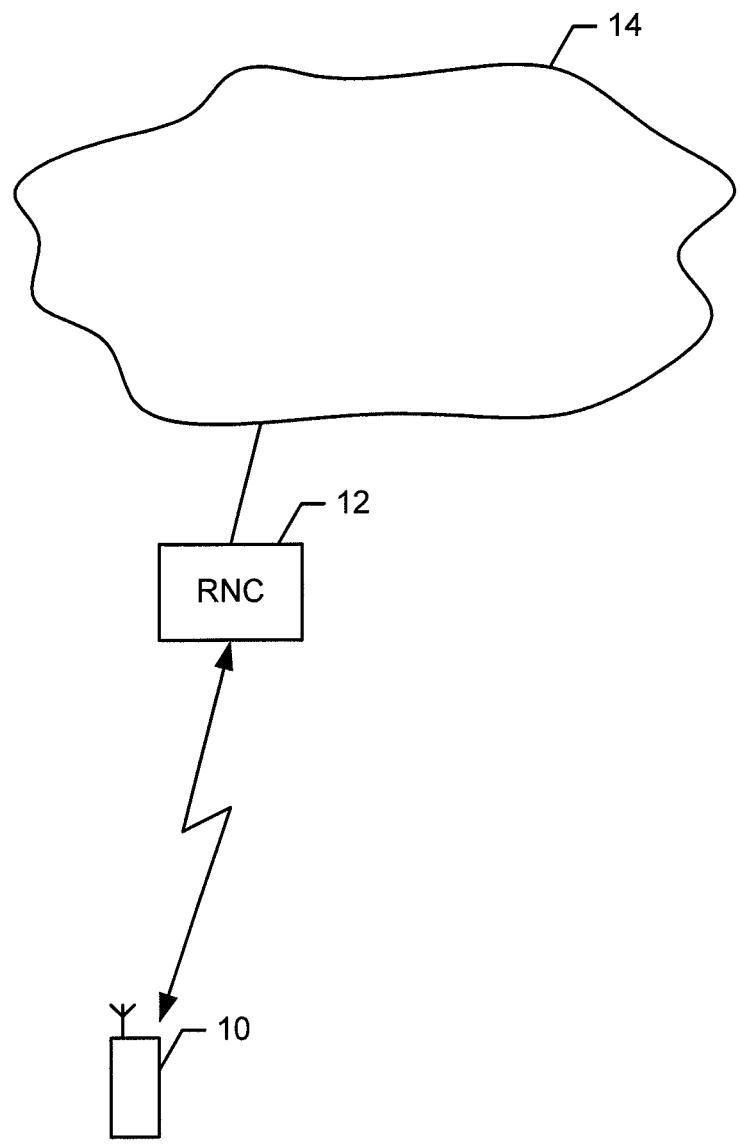
Figure 2:
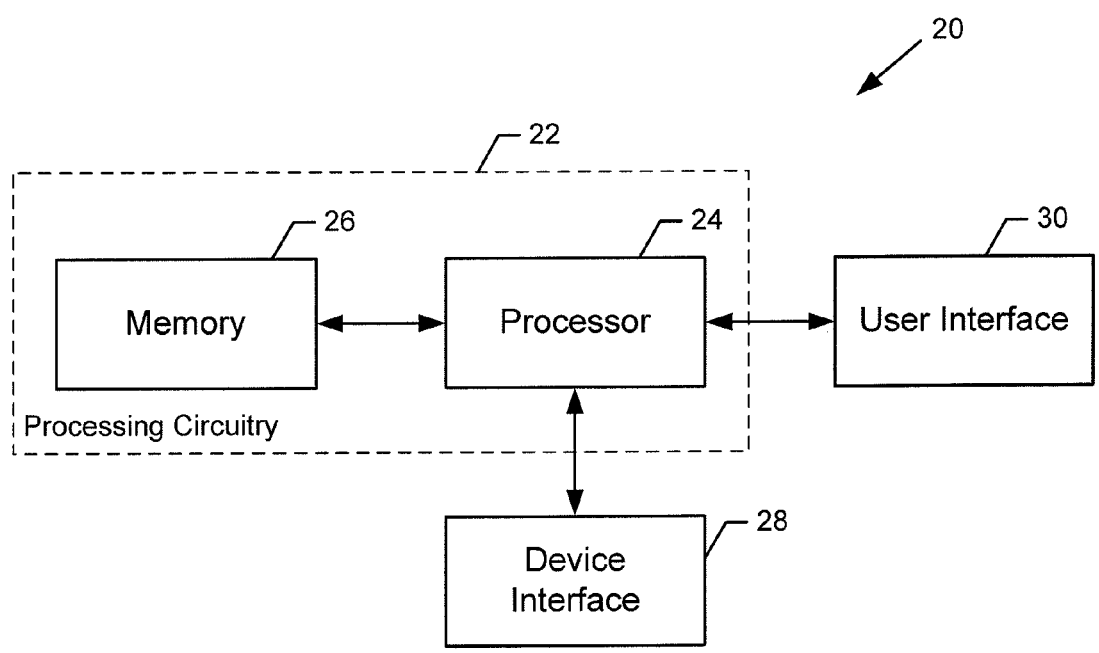
Figure 3:
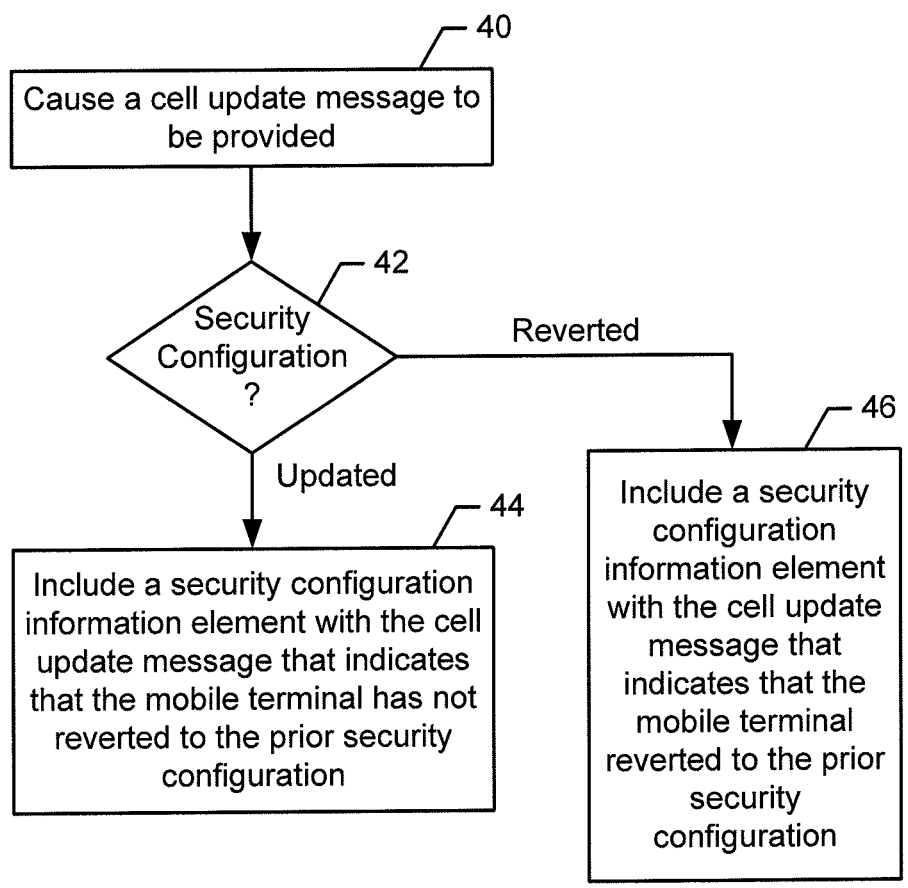

Having thus described embodiments of the invention in general terms, reference will now be made to the accompanying drawings, which are not necessarily drawn to scale, and wherein:

FIG. 1 is one example of a communication system according to an embodiment of the present invention;

FIG. 2 is a block diagram of an apparatus in accordance with an example embodiment of the present invention;

FIG. 3 is a flow chart illustrating operations performed by an apparatus in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, apparatus and computer program product are provided for insuring that a mobile terminal and the network, such as a radio network controller (RNC), remain synchronized in regards to the security configuration by which both the mobile terminal and the network operate. In particular, the method, apparatus and computer program product of embodiments of the present invention insure that a mobile terminal and the network operate in accordance with the same security configuration even during a cell update, such as may be initiated by a cell reselection, by re-entering the service area (after out of service detection) or after a radio link control (RLC) unrecoverable error detection. Although the method, apparatus and computer program product may be implemented in a variety of different systems, one example of such a system is shown in FIG. 1, which includes a first communication device (e.g., mobile terminal 10) that is capable of communication with a network 14 (e.g., a core network) via, for example, an RNC 12. While the network may be configured in accordance with a Universal Mobile Telecommunications System (UMTS) Terrestrial Radio Access Network (UTRAN), the network may employ other mobile access mechanisms such as Long Term Evolution (LTE), LTE-Advanced (LTE-A), wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more base stations, such as one or more node Bs, evolved node Bs (eNBs), access points or the like, each of which may serve a coverage area divided into one or more cells. The base station or other communication node could be, for example, part of one or more cellular or mobile networks or public land mobile networks (PLMNs). In turn, other devices such as processing devices (e.g., personal computers, server computers or the like) may be coupled to the mobile terminal and/or the second communication device via the network.

One or more communication terminals such as the mobile terminal 10 may be in communication with each other or other devices via the network 14. In some cases, each of the communication terminals may include an antenna or antennas for transmitting signals to and for receiving signals from a base station. In some example embodiments, the mobile terminal, also known as user equipment (UE) may be a mobile communication device such as, for example, a mobile telephone, portable digital assistant (PDA), pager, laptop computer, or any of numerous other hand held or portable communication devices, computation devices, content generation devices, content consumption devices, universal serial bus (USB) dongles, data cards or combinations thereof. As such, the mobile terminal may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal may also include communication circuitry and corresponding hardware/software to enable communication with other devices and/or the network 14.

In one embodiment, for example, the mobile terminal 10 may be embodied as or otherwise include an apparatus 20 as generically represented by the block diagram of FIG. 2. In this regard, the apparatus may provide information to the network 14 regarding the security configuration configuration of the mobile terminal such that the network and the mobile terminal can maintain the same security configuration configuration, even during a cell update procedure. While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface in the context of a mobile terminal 10 may include, for example, a keyboard, a mouse, a joystick, a display, a touch screen, a microphone, a speaker, and/or other input/output mechanisms.

The device interface 28 may include one or more interface mechanisms for enabling communication with other devices and/or networks. In some cases, the device interface may be any means such as a device or circuitry embodied in either hardware, or a combination of hardware and software that is configured to receive and/or transmit data from/to a network 14 and/or any other device or module in communication with the processing circuitry 22. In this regard, the device interface may include, for example, an antenna (or multiple antennas) and supporting hardware and/or software for enabling communications with a wireless communication network and/or a communication configurationm or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Referring now to FIG. 3, a flowchart illustrating the operations performed by a method, apparatus and computer program product, such as apparatus 20 of FIG. 2, in accordance with one embodiment of the present invention are illustrated. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 3, when executed, convert a computer or processing circuitry into a particular machine configured to perform an example embodiment of the present invention. Accordingly, the operations of FIG. 3 define an algorithm for configuring a computer or processing circuitry, e.g., the processor 24, to perform an instance of the processor, which performs the algorithm shown in FIG. 3, to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In accordance with embodiments of the present invention, the network 14, such as the RNC 12, and a mobile terminal 10 may have commenced a security configuration command procedure in which the security configuration, including ciphering and integrity protection, is to be updated from a prior security configuration to an updated security configuration. In this regard, the security configuration command procedure generally commences with a security configuration command being issued by the core network to the RNC and, in turn, to the mobile terminal. The mobile terminal, such as the processing circuitry 22, the processor 24 or the like, then begins the process of updating the security configuration and, once complete, reports to the RNC and, in turn, to the core network regarding the completion of the updating of the security configuration. While the core network may complete the updating of the security configuration upon receipt of the security configuration complete message from the mobile terminal, the mobile terminal does not complete the security configuration update until the mobile terminal receives an acknowledgement, such as an L2 RLC-AM ACK, from the RNC.

During and prior to completion of the security configuration command procedure or shortly after completion of the security configuration command procedure, a cell update procedure may be commenced, such as a cell reselection procedure, re-entry into a service area, an RLC unrecoverable error detection or the like. During the cell update procedure and as shown in block 40 of FIG. 3, the mobile terminal 10 may include means, such as the processing circuitry 22, the processor 24, the device interface 28 or the like, for causing a cell update message to be provided to the network 14, such as the RNC 12. In order to ensure that both the network, including the RNC, and the mobile terminal are operating in accordance with the same security configuration, the mobile terminal, such as the processing circuitry, the processor, the device interface or the like, may determine whether the security configuration of the mobile terminal has been updated or whether the security configuration has not yet been updated, but has remained or reverted to the prior security configuration. See block 42 of FIG. 3. In this regard, the mobile terminal may include means, such as the processing circuitry, the processor or the like, for applying the updated security configuration prior to provision of the cell update message, such as in instances in which the mobile terminal receives the acknowledgement, such as an L2 RLC-AM ACK, from the RNC prior to commencement of the cell update procedure. The mobile terminal may also include means, such as the processing circuitry, the processor or the like, for reverting to the prior security configuration prior to provision of the cell update message, such as in instances in which the mobile terminal has not received the acknowledgement, such as an L2 RLC-AM ACK, from the RNC prior to commencement of the cell update procedure.

In an instance in which the security configuration has been updated by the mobile terminal 10, such as in an instance in which an acknowledgement, such as an L2 RLC-AM ACK, is received by the mobile terminal from the RNC 12 prior to commencement of the cell update procedure, the mobile terminal may include means, such as the processing circuitry 22, the processor 24, the device interface 28 or the like, for including a security configuration information element with the cell update message. See block 44 of FIG. 3. In this instance, the security configuration information element may indicate that the mobile terminal has applied an updated security configuration, such as by indicating in one embodiment that the mobile terminal has not reverted to the prior security configuration. Conversely, in an instance in which the mobile terminal has reverted to the prior security configuration, such as in an instance in which the mobile terminal has not received the acknowledgement, such as an L2 RLC-AM ACK, from the RNC prior to commencement of the cell update procedure, the mobile terminal may include means, such as the processing circuitry, the processor, the device interface or the like, for including a security configuration information element, albeit with different content or information, with the cell update message. See block 46 of FIG. 3. In this instance, the security configuration information element may indicate that the mobile terminal has reverted to the prior security configuration.

Based upon the content of the security configuration information element with the cell update message, the network 14, such as the RNC 12, may readily determine the security configuration of the mobile terminal 10. In particular, in an instance in which the cell update message includes a security configuration information element indicating that the mobile terminal has applied an updated security configuration, the network, such as the RNC, may determine that the mobile terminal has applied the updated security configuration. As such, the network, such as the RNC, may similarly apply the updated security configuration such that subsequent communications with the mobile terminal may be conducted in accordance with the updated security configuration. Conversely, in an instance in which the cell update message includes a security configuration information element indicating that the mobile terminal has reverted to the prior security configuration, the network, such as the RNC, may determine that the mobile terminal has reverted to the prior security configuration. As such, the network, such as the RNC, may similarly revert to the prior security configuration such that subsequent communications with the mobile terminal may be conducted in accordance with the prior security configuration. In either instance, the mobile terminal and the network, including the RNC, may thereafter have matching security configurations while avoiding security mismatches that might otherwise lead to the loss of service.

By including a security configuration information element with the cell update message that expressly indicates whether the mobile terminal: (i) has applied an updated security configuration, such as by not reverting to a prior security configuration, or (ii) has reverted to the prior security configuration, the mobile terminal and the network 14 do not suffer from inter-operability issues in situations in which only one of the mobile terminal or the network have implemented embodiments of the present invention. Indeed, the network is not left in a position to guess as to mobile terminal's security configuration in an instance in which the cell update message failed to include an information element since the express provision of the security configuration information element in either instance provides surety in the determination made by the network. Additionally, the network may advantageously process these messages received from all mobile terminals, including both legacy or older mobile terminals and more recent releases of the mobile terminal, in the same fashion, thereby simplifying the network implementation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   causing a report to be provided to a network regarding completion of an update of a security configuration;
   separately causing a cell update message to be provided from a mobile terminal to the network during performance of a cell update procedure;
   including, with the cell update message, a security configuration information element indicating that the mobile terminal has applied an updated security configuration in an instance in which the mobile terminal has received an acknowledgement of the report regarding completion of the update of the security configuration prior to commencement of the cell update procedure and has applied the updated security configuration to change from a prior security configuration to the updated security configuration; and
   including, with the cell update message, the security configuration information element indicating that the mobile terminal has reverted to the prior security configuration in an instance in which the mobile terminal has not received an acknowledgement of the report regarding completion of the update of the security configuration prior to commencement of the cell update procedure and has reverted to the prior security configuration.

2. A method according to claim 1 wherein including the security configuration information element indicating that a mobile terminal has applied an updated security configuration comprises including the security configuration information element indicating that the mobile terminal has not reverted to the prior security configuration.

3. A method according to claim 1 further comprising applying the updated security configuration prior to causing the cell update message to be provided.

4. A method according to claim 1 further comprising reverting to the prior security configuration prior to causing the cell update message to be provided.

5. A method according to claim 1 wherein causing the cell update message to be provided comprises causing the cell update message to be provided after completion of a cell reselection procedure.

6. A method according to claim 1 further comprising commencing the cell update procedure during and prior to completion of a security configuration command procedure.

7. An apparatus comprising:
   means for causing a report to be provided to a network regarding completion of an update of a security configuration;
   means for separately causing a cell update message to be provided from a mobile terminal to the network during performance of a cell update procedure;
   means for including, with the cell update message, a security configuration information element indicating that the mobile terminal has applied an updated security configuration in an instance in which the mobile terminal has received an acknowledgement of the report regarding completion of the update of the security configuration prior to commencement of the cell update procedure and has applied the updated security configuration; and
   means for including, with the cell update message, the security configuration information element indicating that the mobile terminal has not received an acknowledgement of the report regarding completion of the update of the security configuration prior to commencement of the cell update procedure and has reverted to the prior security configuration in an instance in which the mobile terminal has reverted to the prior security configuration.

8. An apparatus according to claim 7 wherein the means for including the security configuration information element indicating that a mobile terminal has applied an updated security configuration comprises means for including the security configuration information element indicating that the mobile terminal has not reverted to the prior security configuration.

9. An apparatus according to claim 7 further comprising means for applying the updated security configuration prior to causing the cell update message to be provided.

10. An apparatus according to claim 7 further comprising means for reverting to the prior security configuration prior to causing the cell update message to be provided.

11. An apparatus according to claim 7 wherein the means for causing the cell update message to be provided comprises means for causing the cell update message to be provided after completion of a cell reselection procedure.

12. An apparatus according to claim 7 further comprising means for commencing the cell update procedure during and prior to completion of a security configuration command procedure.

13. A computer program product comprising at least one non-transitory computer-readable storage medium having computer-executable program code instructions stored therein, the computer-executable program code instructions comprising program code instructions for:
   causing a report to be provided to a network regarding completion of an update of a security configuration;
   separately causing a cell update message to be provided from a mobile terminal to the network during performance of a cell update procedure;
   including, with the cell update message, a security configuration information element indicating that the mobile terminal has received an acknowledgement of the report regarding completion of the update of the security configuration prior to commencement of the cell update procedure and has applied an updated security configuration in an instance in which the mobile terminal has applied the updated security configuration; and
   including, with the cell update message, the security configuration information element indicating that the mobile terminal has not received an acknowledgement of the report regarding completion of the update of the security configuration prior to commencement of the cell update procedure and has reverted to the prior security configuration in an instance in which the mobile terminal has reverted to the prior security configuration.

14. A computer program product according to claim 13 wherein the program code instructions for including the security configuration information element indicating that a mobile terminal has applied an updated security configuration comprise program code instructions for including the security configuration information element indicating that the mobile terminal has not reverted to the prior security configuration.

15. A computer program product according to claim 13 wherein the computer-executable program code instructions further comprise program code instructions for applying the updated security configuration prior to causing the cell update message to be provided.

16. A computer program product according to claim 13 wherein the computer-executable program code instructions further comprise program code instructions for reverting to the prior security configuration prior to causing the cell update message to be provided.

17. A computer program product according to claim 13 wherein the program code instructions for causing the cell update message to be provided comprise program code instructions for causing the cell update message to be provided after completion of a cell reselection procedure.

18. A computer program product according to claim 13 wherein the computer-executable program code instructions further comprise program code instructions for commencing the cell update procedure during and prior to completion of a security configuration command procedure.

* * * * *